(12) United States Patent
Beyer et al.

(10) Patent No.: US 8,226,048 B2
(45) Date of Patent: Jul. 24, 2012

(54) LINK MECHANISMS, INCLUDING STEPHENSON II LINK MECHANISMS FOR MULTI-POSITION FLAPS AND ASSOCIATED SYSTEMS AND METHODS

(75) Inventors: Kevin W. Beyer, Seattle, WA (US); Seiya Sakurai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 711 days.

(21) Appl. No.: 12/331,193

(22) Filed: Dec. 9, 2008

(65) Prior Publication Data
US 2010/0140414 A1 Jun. 10, 2010

(51) Int. Cl.
*B64C 3/50* (2006.01)
(52) U.S. Cl. .......... 244/214; 244/201; 244/213
(58) Field of Classification Search .......... 244/214, 244/201, 213, 49, 204
See application file for complete search history.

(56) References Cited

U.S. PATENT DOCUMENTS

| | | | |
|---|---|---|---|
| 1,724,456 A | 8/1929 | Crook | |
| 1,770,575 A | 7/1930 | Ksoll | |
| 1,785,620 A | 12/1930 | Frise | |
| 1,913,169 A | 6/1933 | Martin | |
| 2,086,085 A | 7/1937 | Lachmann et al. | |
| 2,138,952 A | 12/1938 | Blume | |
| 2,169,416 A | 8/1939 | Griswold | |
| 2,207,453 A | 7/1940 | Blume | |
| 2,282,516 A | 5/1942 | Gropler et al. | |
| 2,289,704 A | 7/1942 | Grant | |
| 2,319,383 A | 5/1943 | Zap | |
| 2,347,230 A | 4/1944 | Zuck | |
| 2,358,985 A | 9/1944 | McAndrew | |
| 2,378,528 A | 6/1945 | Arsandaux | |
| 2,383,102 A | 8/1945 | Zap | |
| 2,387,492 A | 10/1945 | Blaylock et al. | |
| 2,504,684 A | 4/1950 | Harper | |
| 2,518,854 A | 8/1950 | Badenoch | |
| 2,555,862 A | 6/1951 | Romani | |
| 2,563,453 A | 8/1951 | Briend | |

(Continued)

FOREIGN PATENT DOCUMENTS
EP 0100775 2/1984
(Continued)

OTHER PUBLICATIONS

U.S. Appl. No. 11/453,596, filed Jun. 14, 2006, Fox et al.

(Continued)

*Primary Examiner* — J. Woodrow Eldred
(74) *Attorney, Agent, or Firm* — Perkins Coie LLP (57) ABSTRACT

Link mechanisms, including Stephenson II link mechanisms for multi-position flaps and associated systems and methods are disclosed. A system in accordance with a particular embodiment includes an airfoil having an external flow surface with an upper portion and a lower portion, and with the airfoil forming a base link. The system further includes a six-bar linkage coupled to the airfoil and having a Stephenson II configuration, including a binary second link pivotably connected to the airfoil, a ternary third link pivotably connected to the second link, a binary fourth link pivotably connected to the third link, a ternary fifth link pivotably connected to the airfoil and the fourth link, and a binary sixth link pivotably connected to the third link and the fifth link. The system can further include a deployable leading edge panel carried by the linkage, with the leading edge panel being movable via the linkage between a stowed position and at least one deployed position.

26 Claims, 9 Drawing Sheets

U.S. PATENT DOCUMENTS

| | | |
|---|---|---|
| 2,652,812 A | 9/1953 | Fenzl |
| 2,665,084 A | 1/1954 | Feeney et al. |
| 2,665,085 A | 1/1954 | Crocombe et al. |
| 2,702,676 A | 2/1955 | Delaney, Jr. |
| 2,851,229 A | 9/1958 | Clark |
| 2,912,190 A | 11/1959 | MacDonough |
| 2,920,844 A | 1/1960 | Marshall et al. |
| 2,938,680 A | 5/1960 | Greene et al. |
| 3,013,748 A | 12/1961 | Westburg |
| 3,089,666 A | 5/1963 | Quenzler |
| 3,112,089 A | 11/1963 | Dornier |
| 3,203,647 A | 8/1965 | Alvarez-Calderon |
| 3,282,535 A | 11/1966 | Steiner |
| 3,375,998 A | 4/1968 | Alvarez-Calderon |
| 3,486,720 A | 12/1969 | Seglem et al. |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,642,234 A | 2/1972 | Kamber et al. |
| 3,655,149 A | 4/1972 | Williams |
| 3,704,828 A | 12/1972 | Studer et al. |
| 3,711,039 A | 1/1973 | James |
| 3,743,219 A | 7/1973 | Gorges et al. |
| 3,767,140 A | 10/1973 | Johnson |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,847,369 A | 11/1974 | Phillips et al. |
| 3,874,617 A | 4/1975 | Johnson |
| 3,897,029 A | 7/1975 | Calderon et al. |
| 3,910,530 A | 10/1975 | James et al. |
| 3,917,192 A | 11/1975 | Alvarez-Calderon et al. |
| 3,941,334 A | 3/1976 | Cole |
| 3,949,957 A | 4/1976 | Portier et al. |
| 3,954,231 A | 5/1976 | Fraser |
| 3,985,319 A | 10/1976 | Dean et al. |
| 3,987,983 A | 10/1976 | Cole |
| 3,994,451 A | 11/1976 | Cole |
| 4,117,996 A | 10/1978 | Sherman |
| 4,120,470 A | 10/1978 | Whitener |
| 4,131,253 A | 12/1978 | Zapel |
| 4,171,787 A | 10/1979 | Zapel |
| 4,172,575 A | 10/1979 | Cole |
| 4,189,120 A | 2/1980 | Wang |
| 4,189,121 A | 2/1980 | Harper et al. |
| 4,200,253 A | 4/1980 | Rowarth et al. |
| 4,202,519 A | 5/1980 | Fletcher |
| 4,248,395 A | 2/1981 | Cole |
| 4,262,868 A | 4/1981 | Dean |
| 4,283,029 A | 8/1981 | Rudolph |
| 4,285,482 A | 8/1981 | Lewis |
| 4,293,110 A | 10/1981 | Middleton et al. |
| 4,312,486 A | 1/1982 | McKinney |
| 4,351,502 A | 9/1982 | Statkus |
| 4,353,517 A | 10/1982 | Rudolph |
| 4,360,176 A | 11/1982 | Brown |
| 4,365,774 A | 12/1982 | Coronel |
| 4,384,693 A | 5/1983 | Pauly et al. |
| 4,427,168 A | 1/1984 | McKinney et al. |
| 4,444,368 A | 4/1984 | Andrews |
| 4,448,375 A | 5/1984 | Herndon |
| 4,470,569 A | 9/1984 | Shaffer et al. |
| 4,471,927 A | 9/1984 | Rudolph et al. |
| 4,475,702 A | 10/1984 | Cole |
| 4,542,869 A | 9/1985 | Brine |
| 4,544,117 A | 10/1985 | Schuster |
| 4,553,722 A | 11/1985 | Cole |
| 4,605,187 A | 8/1986 | Stephenson |
| 4,650,140 A | 3/1987 | Cole |
| 4,669,687 A | 6/1987 | Rudolph |
| 4,702,442 A | 10/1987 | Weiland et al. |
| 4,706,913 A | 11/1987 | Cole |
| 4,962,902 A | 10/1990 | Fortes |
| 5,039,032 A | 8/1991 | Rudolph |
| 5,158,252 A | 10/1992 | Sakurai |
| 5,207,400 A | 5/1993 | Jennings et al. |
| 5,474,265 A | 12/1995 | Capbern et al. |
| 5,544,847 A | 8/1996 | Bliesner |
| 5,564,655 A | 10/1996 | Garland et al. |
| 5,836,550 A | 11/1998 | Paez |
| 5,839,698 A | 11/1998 | Moppert |
| 5,921,506 A | 7/1999 | Appa |
| 5,927,656 A | 7/1999 | Hinkleman |
| 6,015,117 A | 1/2000 | Broadbent et al. |
| 6,375,126 B1 | 4/2002 | Sakurai et al. |
| 6,464,176 B2 | 10/2002 | Uchida et al. |
| 6,601,801 B1 | 8/2003 | Prow et al. |
| 6,796,534 B2 | 9/2004 | Beyer et al. |
| 6,860,452 B2 | 3/2005 | Bacon et al. |
| 7,048,234 B2 | 5/2006 | Recksiek et al. |
| 7,243,881 B2 | 7/2007 | Sakurai et al. |
| 7,258,308 B2 | 8/2007 | Beyer et al. |
| 7,264,206 B2 | 9/2007 | Wheaton et al. |
| 7,270,305 B2 | 9/2007 | Rampton et al. |
| 7,578,484 B2 * | 8/2009 | Fox et al. ............... 244/214 |
| 2005/0040294 A1 | 2/2005 | Perez-Sanchez et al. |
| 2005/0230565 A1 | 10/2005 | Kallinen |
| 2005/0242243 A1 | 11/2005 | Seve |
| 2006/0144996 A1 | 7/2006 | Carl et al. |
| 2006/0175468 A1 | 8/2006 | Huynh et al. |
| 2006/0226297 A1 | 10/2006 | Perez-Sanchez |
| 2007/0034748 A1 | 2/2007 | Sakurai et al. |
| 2007/0114328 A1 | 5/2007 | Lacy et al. |
| 2007/0114329 A1 | 5/2007 | Lacy et al. |
| 2008/0001036 A1 | 1/2008 | Voogt |
| 2008/0283672 A1 | 11/2008 | Denzler et al. |
| 2009/0146017 A1 | 6/2009 | Lacy et al. |
| 2009/0206209 A1 | 8/2009 | Good et al. |
| 2009/0308983 A1 | 12/2009 | Jones |
| 2010/0025537 A1 | 2/2010 | Wheaton et al. |
| 2010/0170998 A1 | 7/2010 | Lacy et al. |
| 2010/0286849 A1 | 11/2010 | Huynh et al. |

FOREIGN PATENT DOCUMENTS

| | | |
|---|---|---|
| EP | 0103038 | 3/1984 |
| EP | 0781704 | 7/1997 |
| EP | 1338506 | 8/2003 |
| FR | 705155 | 6/1931 |
| WO | WO-2008051286 | 5/2008 |

OTHER PUBLICATIONS

Olson, Daniel G., "What is a Watt I Linkage?"; http://www.mines.edu/fs_home/dgolson/WattOneB.html; [accessed Jul. 31, 2008]; 1 pg.

Slocum, Alexander "FUNdaMENTAL of Design: Topic 4 Linkages" Jan. 1, 2008, 62 pages.

Dijksman, E.A. "Six-Bar Cognates of a Stephenson Mechanism" Jnl. Mechanisms vol. 6. pp. 31-57, Pergamon Press 1971.

Non-Final Office Action for U.S. Appl. No. 11/453,596, mailed on Sep. 23, 2008, 23 pages.

Applicant's Response to Non-Final Office Action for U.S. Appl. No. 11/453,596, filed on Jan. 15, 2009, 16 pages.

"Flap (aircraft)", Wikipedia, The Free Encyclopedia, Jul. 20, 2006, 14:15 revision, <http://en.wikipedia.org/w/index.php?title=Flap_%28aircraft%29&oldid=67413665> [accessed Aug. 5, 2006], pp. 1-2.

"Slats" Wikipedia, The Free Encyclopedia, Jun. 27, 2006, 12:23:00 revision, <http://wn.wikipedia.org/w/index.php?title=Slats&oldid=60827639> [accessed Aug. 5, 2006], pp. 1-2.

Morphing Systems, "Morphing Aerostructures—An Overview," www.crgrp.net/morphingsystems.htm, pp. 1-9; (accessed Aug. 31, 2005).

* cited by examiner

LINK MECHANISMS, INCLUDING STEPHENSON II LINK MECHANISMS FOR MULTI-POSITION FLAPS AND ASSOCIATED SYSTEMS AND METHODS

TECHNICAL FIELD

The present disclosure is directed generally to link mechanisms, including Stephenson II link mechanisms for multi-position flaps and associated systems and methods.

BACKGROUND

Modern aircraft often use a variety of high-lift leading and trailing edge devices to improve high angle of attack performance during various phases of flight, including take-off and landing. Existing leading edge devices include leading edge slats and Krueger flaps. Leading edge slats generally have a stowed position in which the slat forms a portion of the leading edge of the wing, and one or more deployed positions in which the slat extends forward and down to increase the camber and/or planform area of the wing. Krueger flaps have generally the same function as leading edge slats, but rather than retracting aft to form the leading edge of the wing, Krueger flaps typically fold into the lower surface of the wing when stowed. One drawback with some current leading edge devices is that they may interfere with achieving laminar flow during cruise. Accordingly, there is a need to provide a leading edge device that improves upon current devices and makes laminar flow easier to achieve and sustain during cruise. Another drawback with existing leading edge devices is that they are in some cases difficult to integrate with other structures in the wing leading edge. This drawback can be particularly significant for thin wings, and/or for the thin outboard portions of otherwise thicker wings.

SUMMARY

The following summary is provided for the benefit of the reader only and is not intended to limit the disclosure in any way. The present disclosure is directed generally to link mechanisms for multi-position flaps, and associated systems and methods. A system in accordance with a particular embodiment includes an airfoil having an external flow surface, with the external flow surface comprising an upper portion and a lower portion, and the airfoil forming a base link. The system can further include a six-bar linkage coupled to the airfoil and having a Stephenson II configuration. The linkage can include a binary second link pivotably connected to the airfoil, a ternary third link pivotably connected to the second link, a binary fourth link pivotably connected to the third link, a ternary fifth link pivotably connected to the airfoil and the fourth link, and a binary sixth link pivotably connected to the third link and the fifth link. The system can further include a deployable leading edge panel carried by the linkage, with the leading edge panel being moveable via the linkage between a stowed position and at least one deployed position.

In a particular embodiment, the leading edge panel is fixedly carried by the fourth link. In another embodiment, the leading edge panel is pivotable relative to the fourth link. In still another embodiment, the second link is pivotably connected to the airfoil at a first location, the fifth link is pivotably connected to the airfoil at a second location forward of the first location, and the system further comprises an ice protection airflow duct positioned between the first and second locations. In yet a further embodiment, the system can further include a bullnose pivotably coupled to the leading edge panel, and a support panel pivotably coupled to the leading edge panel, the bullnose and the third link. A seventh link can be pivotably connected between the support panel and the fifth link. The at least one deployed position can include a landing position and a take-off position, and the leading edge panel can form a part of the lower portion of the airfoil when in the stowed position, can have a trailing edge that is spaced apart from the upper portion of the airfoil to form a gap when in the landing position, and can seal the gap when in the take-off position. The leading edge panel can be flexible and can change shape as the leading edge panel moves from the stowed position to at least one of the landing position and the take-off position.

Still further aspects of the disclosure are directed to methods for operating an aircraft wing system. One such method includes deploying a leading edge panel relative to an airfoil having an external flow surface, and shielding the airfoil with the leading edge panel during take-off to at least restrict debris from attaching to the external flow surface. The method can further include stowing the leading edge panel after take-off, promoting laminar flow over an upper portion of the external flow surface during cruise, and deploying the leading edge panel to be spaced apart from a leading edge of the wing during at least one of approach and landing. In a particular aspect of this method, deploying the leading edge panel can include deploying a six-bar linkage coupled to the airfoil and having a Stephenson II configuration that includes a binary second link pivotably connected to the airfoil, a ternary third link pivotably connected to the second link, a binary fourth link pivotably connected to the third link, a ternary fifth link pivotably connected to the airfoil and the fourth link, and a binary sixth link pivotably connected to the third link and the fifth link, with the leading edge panel carried by the linkage.

DETAILED DESCRIPTION

The present disclosure describes link mechanisms for multi-position flaps and associated systems and methods. Certain specific details are set forth in the following description and FIGS. 1-11 to provide a thorough understanding of the various embodiments of the disclosure. Well-known structures, systems, and methods often associated with such systems have not been shown or described in detail to avoid unnecessarily obscuring the description of various embodiments of the disclosure. In addition, those of ordinary skill in the relevant art will understand that additional embodiments of the disclosure may be practiced without several of the details described below.

Figure 1:
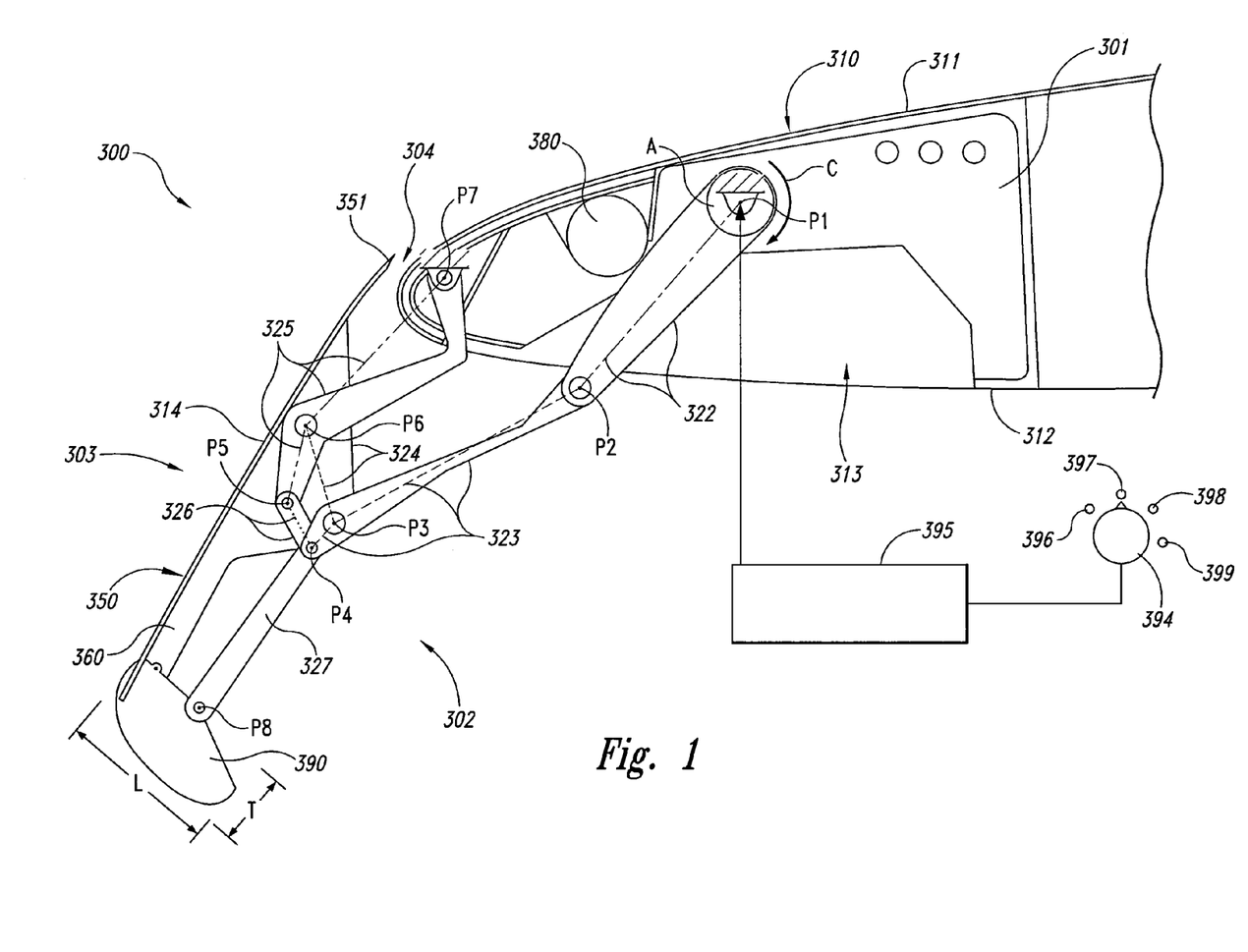
FIG. 1 is a partially schematic illustration of an aircraft system configured in accordance with an embodiment of the disclosure that includes a rigid Krueger flap.

FIGS. 1-5 illustrate an embodiment of the disclosure that includes a rigid Krueger flap, and FIGS. 6-10 illustrate an embodiment that includes a variable camber Krueger flap. FIG. 1 is a partially schematic illustration of an aircraft system 300 having a leading edge assembly 303 and an associated linkage or link mechanism 302 configured in accordance with an embodiment of the disclosure. In one example, the leading edge assembly 303 is positioned to provide enhanced airflow characteristics for an airfoil 301 on which it is installed. General attributes of the airfoil 301 and more detailed attributes of the leading edge assembly 303 and the link mechanism 302 are described below.

The airfoil 301 may be configured for operation at any of a variety of flight conditions. In one embodiment, the airfoil 301 can be a wing, and in other embodiments, the airfoil 301 can include other surfaces designed to produce lift from the movement of air. The particular airfoil 301 shown in FIGS. 1-10, for example, is configured for cruise at high subsonic Mach numbers representative of typical commercial transport airliners. Accordingly, the airfoil 301 can include an external flow surface 310 having a rounded leading edge. The external flow surface 310 includes an upper portion 311 and a lower portion 312. In some configurations, the lower portion 312 may include an opening 313. When the leading edge assembly 303 is deployed to a landing position, as shown in FIG. 1, the opening 313 is exposed. When the leading edge assembly 303 is stowed, it closes the opening 313 as described further below with reference to FIG. 3.

The leading edge assembly 303 can include a bullnose 390 that is pivotably connected to a leading edge panel 350. In some embodiments the bullnose 390 has a thickness-to-length (T/L) ratio of approximately 0.5. In other embodiments, the bullnose 390 can have other generally blunt shapes, including shapes with T/L ratios greater than 0.5. In general, it is expected that blunt bullnoses will improve aerodynamic performance at certain flight conditions, e.g., low speed conditions. It is also expected that link mechanisms in accordance with at least some of the embodiments disclosed herein can facilitate stowing and deploying such bullnoses.

The leading edge panel 350 can include a streamlined flow surface 314. When the leading edge panel 350 is configured as a rigid Krueger flap, the streamlined flow surface 314 has a generally fixed shape. Accordingly, the streamlined flow surface 314 in the rigid Krueger flap embodiments may undergo small deflections due to aerodynamic loading, but has generally the same shape as shown in FIG. 1 when in its deployed positions and when in its stowed position. When the leading edge panel 350 is configured as a variable camber Krueger flap, the streamlined flow surface 314 changes shape as the leading edge panel 350 is moved or rotated so as to further change the camber of the airfoil 301. In either arrangement, a panel support member 360 can be positioned to support the streamlined flow surface 314.

The leading edge assembly 303 is shown in a representative deployed position (e.g., a landing position) in FIG. 1. In this position, the leading edge panel 350 has a trailing edge 351 that is spaced apart from the upper portion 311 of the airfoil 301 to form a gap 304. In this configuration, the leading edge assembly 303 effectively forms a much blunter (though reasonably aerodynamically efficient) leading edge for the airfoil 301, which allows the airfoil 301 to operate efficiently at high angles of attack, which are typically encountered during approach, landing, and take-off. The link mechanism 302 moves the leading edge assembly 303 to and from the landing position.

The link mechanism 302 can include links that are connected to the airfoil 301 and the panel support member 360 via a series of pivot points P1 through P8. The links can be arranged in a six-bar Stephenson II configuration. This configuration includes a base or first link, formed by the airfoil 301 and five additional links that include binary links (having two pivot connections) and ternary links (having three pivot connections). For purposes of illustration, the base or first link is indicated as "ground," and the remaining links are shown both in outline form (with solid lines) and in a simplified "stick" form (in dashed lines), to more clearly identify the relationships among the links. In an embodiment shown in FIG. 1, the link mechanism 302 can include a binary second link 322 pivotably connected to the airfoil 301 at a first pivot point P1, and pivotably connected to a ternary third link 323 at a second pivot point P2. The third link 323 can be pivotably connected to a binary fourth link 324 at a third pivot point P3, and can be pivotably connected to a binary sixth link 326 at a fourth pivot point P4. The binary fourth link 324 can in turn be pivotably connected to a ternary fifth link 325 at a sixth pivot point P6, and the fifth link 325 can be pivotably connected to the sixth link 326 at a fifth pivot point P5. The fifth link 325 is also pivotably connected to the airfoil 301 at a seventh pivot point P7.

In a particular aspect of this embodiment, the fourth link 324 is formed at least in part by the panel support member 360, which in turn supports the leading edge panel 350. Accordingly, as the fourth link 324 rotates and translates, it articulates the leading edge panel 350 as well. In particular embodiments, the link mechanism 302 can include auxiliary links, for example, a seventh link 327 that is pivotably connected to the third link 323 at the fourth pivot point P4, and is pivotably connected to the bullnose 390 at an eighth pivot point P8 to provide articulated motion for the bullnose 390.

The link mechanism 302 is driven by an actuator A. In an embodiment shown in FIG. 1, the actuator A drives the second link 322, and in other embodiments, the actuator A can drive other links. The actuator A can be coupled to a controller 395. The controller 395 is coupled to a selector 394 that has one or more selectable positions (396, 397, 398, 399). In the embodiment shown in FIG. 1, position 396 corresponds to a take-off position, position 397 corresponds to a landing position, position 398 corresponds to a stowed position, and position 399 is a brake position. The selector 394 can also include other positions or controls depending on aircraft characteristics and specifications. The positions can be selected manually by an operator or automatically via a control system, e.g., via computer-implemented instructions resident on computer-readable media of the controller 395 and/or other computer-based systems or subsystems. Once a position is selected, the controller 395 directs the actuator A to move the leading edge panel 350 to the selected position.

As indicated above, the actuator A can be coupled to the second link 322. The second link 322 is rotatable about the first pivot point P1 as indicated by arrow C. In a particular embodiment, the second link 322 can be rotated by approximately 100 degrees, and in other embodiments it can rotate by other amounts depending on particular aircraft features and requirements. In particular embodiments, the actuator A includes a rotary actuator or a linear type actuator, but other types of actuators may be used in other embodiments. To move the leading edge assembly 303 from the landing position shown in FIG. 1 to the take-off position shown in FIG. 2, the second link 322 may be rotated clockwise, as shown by arrow C, to move the leading edge panel 350 and the bullnose 390 away from the opening 313.

The link mechanism 302 can be arranged to efficiently transmit aerodynamic loads to the airfoil 301, conserve weight, and allow for integration of other airfoil components. For example, the second link 322 may have a generally straight shape. In some embodiments, the fifth link 325 may have a gooseneck or otherwise bent shape. The third link 323 may have a generally straight shape or may include a small bend. These components can have other shapes in other embodiments, depending on factors that may include the manner in which the links are integrated with the airfoil 301.

The leading edge of the airfoil 301 can house components in addition to the link mechanism 302. For example, the airfoil can include an ice protection airflow duct 380 positioned at or near the airfoil leading edge. The airflow duct 380 transmits heated air to the leading edge of the airfoil 301 to prevent and/or inhibit the formation of ice at the leading edge, and/or to remove accumulated ice. As will be described in further detail later, the arrangement of the illustrated link mechanism 302 can allow it to be more readily integrated with components of the wing leading edge, including the airflow duct 380.

Figure 2:
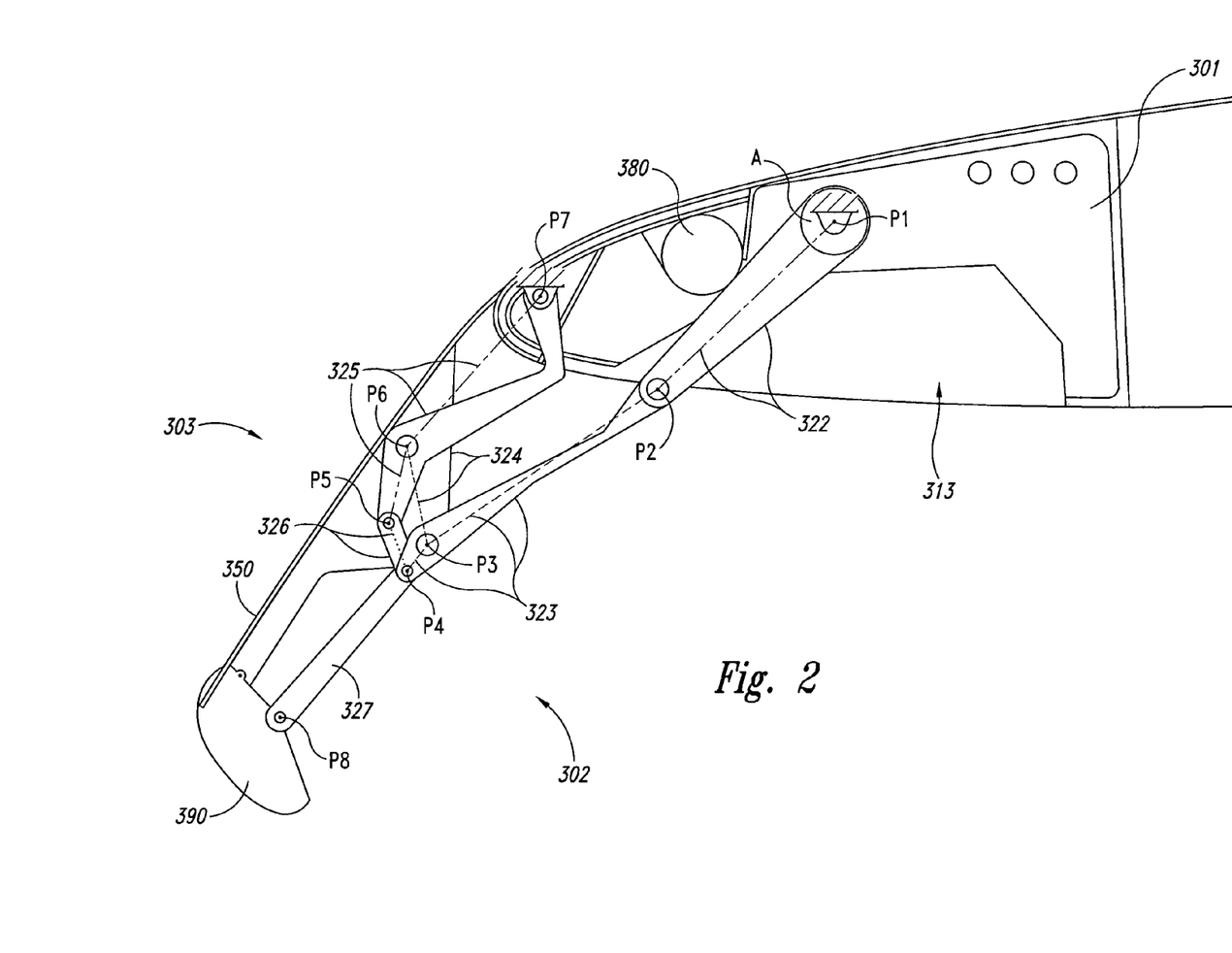
FIG. 2 illustrates the system of FIG. 1 in a take-off position.

FIG. 2 illustrates the system of FIG. 1 with the leading edge assembly 303 in a take-off position. In this position, the leading edge panel 350 is rotated further away from the opening 313. To achieve this position, the second link 322 is rotated about the first pivot point P1 by the actuator A, and as a result, the leading edge panel 350 is rotated into engagement with the airfoil 301. The gap 304 shown in FIG. 1 between the leading edge panel 350 and the upper portion 311 can be sealed as a result of this motion. Sealing the gap 304 during take-off is expected to help maintain a generally smooth surface over the airfoil 301. This can aid in preserving airflow characteristics for achieving laminar flow during cruise. In some embodiments, laminar flow will not be achieved while the leading edge assembly 303 is in the take-off position; however, sealing the gap 304 during take-off can help prevent insects, particles, or other debris encountered during take-off from attaching to the airfoil 301. Shielding the airfoil 301 in this way is expected to increase the likelihood and/or extent of laminar flow achieved during cruise operation.

Figure 3:
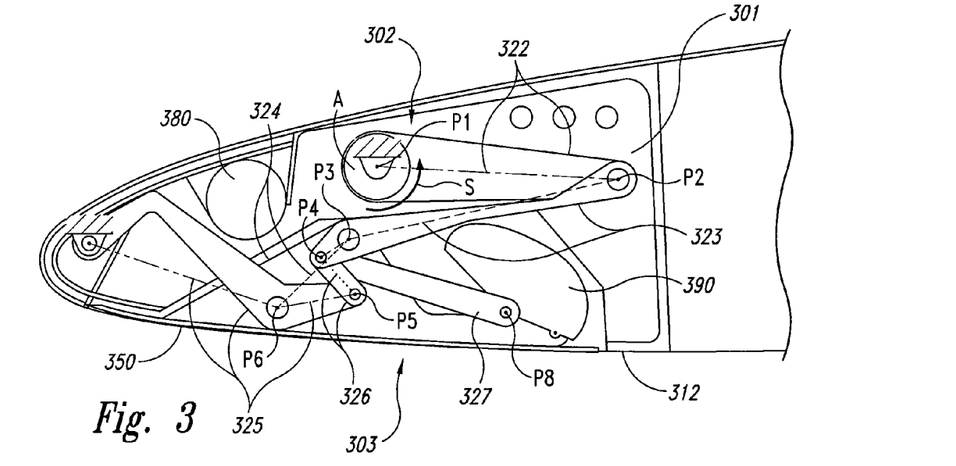
FIG. 3 illustrates the system of FIG. 1 in a stowed position.

FIG. 3 illustrates the system of FIG. 1 with the leading edge assembly 303 in a fully stowed position. When the leading edge assembly 303 is in its stowed position, it covers the opening 313 shown in FIG. 2 to provide for a generally continuous aerodynamically smooth lower portion 312. To achieve this position, the second link 322 is rotated in a counterclockwise direction as shown by arrow S in FIG. 3. In this configuration the leading edge panel 350 has been folded toward the airfoil 301 so as to be flush with the leading edge and the lower surface 312, with the bullnose 390 and the link mechanism 302 housed completely within the airfoil 301. In this configuration, the airfoil 301 is typically flown at conditions not requiring enhanced lift performance, for example, a sustained cruise condition. As discussed above, in at least some embodiments, laminar flow may be easier to achieve and sustain in this configuration because the airfoil 301 has been kept clean during take-off.

Figure 4:
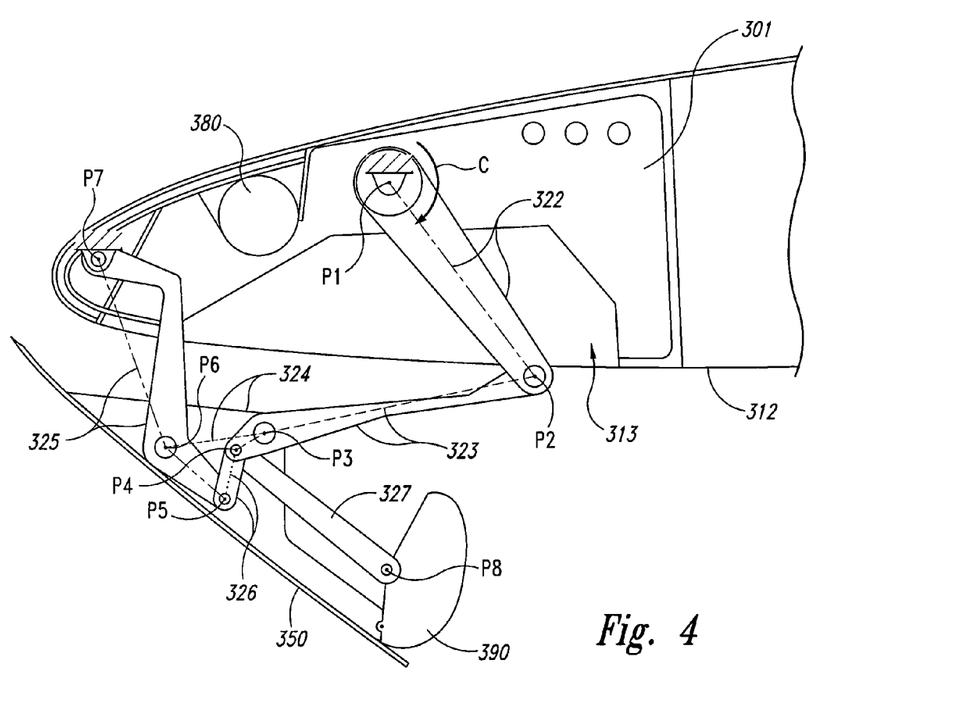
FIG. 4 illustrates the system of FIG. 1 in transition between a stowed position and a take-off and/or a landing position.

FIG. 4 illustrates a snapshot of the system of FIG. 1 with the leading edge panel 350 in transition from the stowed position shown in FIG. 3 to the take-off position and/or the landing position. To achieve this position, the second link 322 is rotated in a clockwise direction as indicated by arrow C. The leading edge panel 350 and the bullnose 390 move accordingly and the opening 313 is exposed.

Figure 5:
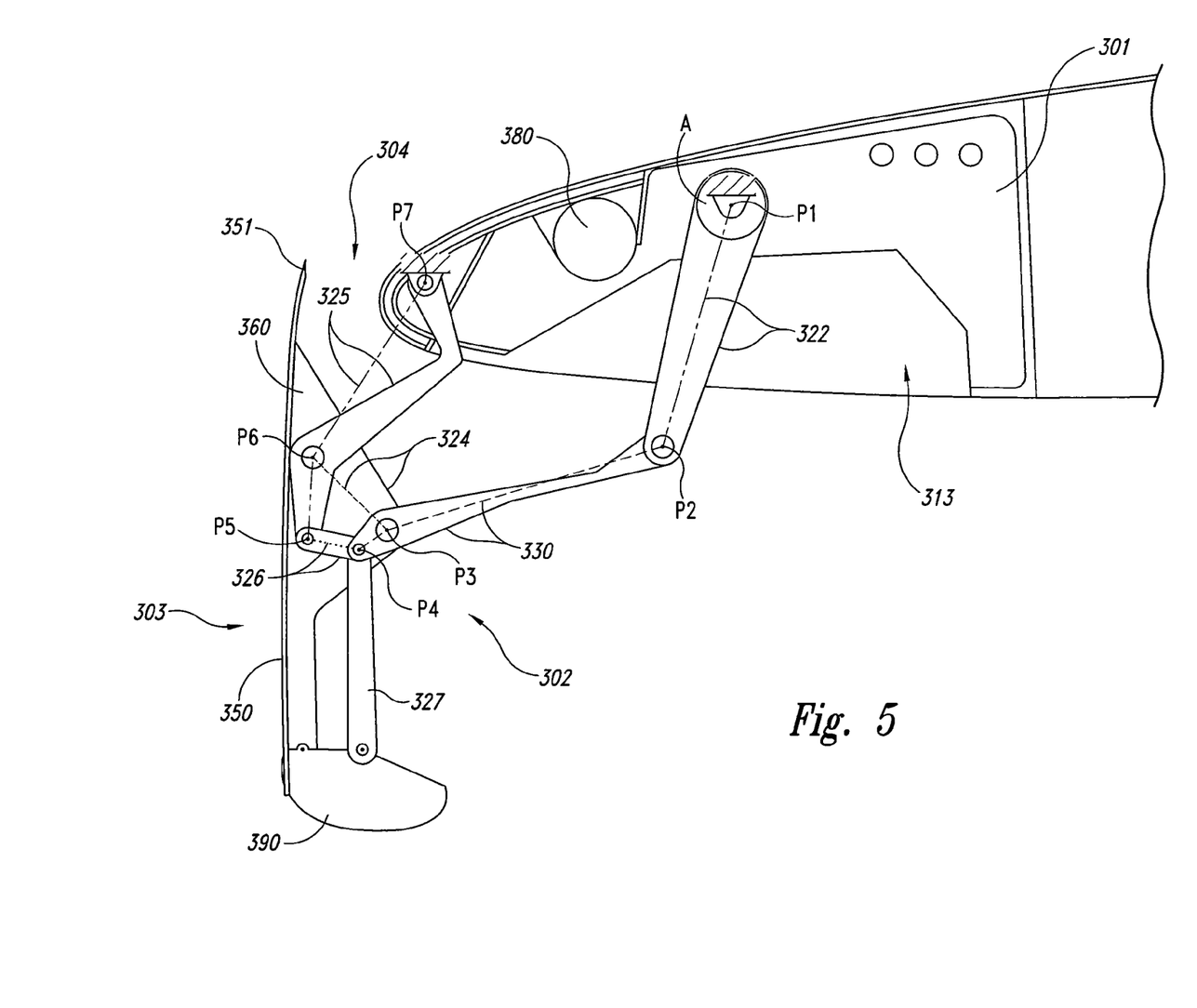
FIG. 5 illustrates the system of FIG. 1 in a generally vertical (e.g., "barn door") configuration.

FIG. 5 illustrates another view of the system of FIG. 1 with the leading edge panel 350 moving to a generally vertical position. The position shown in FIG. 5 is commonly referred to as a "barn door" configuration. In this position, the leading edge assembly 303 can form a very blunt shape that slows the aircraft down, for example, during landing rollout.

FIGS. 4 and 5 illustrate the operation of the leading edge assembly 303 during deployment. The leading edge assembly 303 moves away from the opening 313 as the second link 322 rotates about the first point P1. The third link 323 transfers the motion to the sixth link 326 and the panel support member 360, and the seventh link 327 extends the bullnose 390 forward and outward. The fifth link 325 rotates as the leading edge panel 350 moves up and the trailing edge 351 begins to close the gap 304.

FIGS. 6-10 illustrate an embodiment of the disclosure that includes a leading edge assembly 303 having a variable camber Krueger arrangement. Accordingly, the leading edge assembly 303 includes a flexible leading edge panel 450, e.g., a leading edge panel 450 that changes shape as it is deployed and retracted. In general, the positions of the leading edge panel 450 shown in FIGS. 6-10 correspond to the positions of the leading edge panel 350 described above with reference to FIGS. 1-5, respectively. Beginning with FIG. 6, the leading edge assembly 303 is shown in a landing position similar to the position shown in FIG. 1. In this position, the leading edge panel 450 flexes to a curved shape and has a trailing edge 451 that is spaced apart from the upper portion 311 of the airfoil 301 to form a gap 304. As in FIG. 1, the link mechanism 302 moves the leading edge panel 450 to and from the landing position.

The link mechanism 302 can include links that are arranged in a six-bar, Stephenson II configuration similar at least in part to the arrangement described above with respect to FIGS. 1-5. Accordingly, in an embodiment shown in FIG. 6, the link mechanism 302 can include a binary second link 422 pivotably connected to the airfoil 301 at a first pivot point P1, and pivotably connected to a ternary third link 423 at a second pivot point P2. The third link 423 can be pivotably connected to a fourth link 424 at a third pivot point P3, and can be pivotably connected to a binary sixth link 426 at a fourth pivot point P4. The binary fourth link 424 can in turn be pivotably connected to a ternary fifth link 425 at a sixth pivot point P6, and the fifth link 425 can be pivotably connected to the sixth link 426 at a fifth pivot point P5. The fifth link 425 is also pivotably connected to the airfoil 301 at a seventh pivot point P7.

Figure 6:
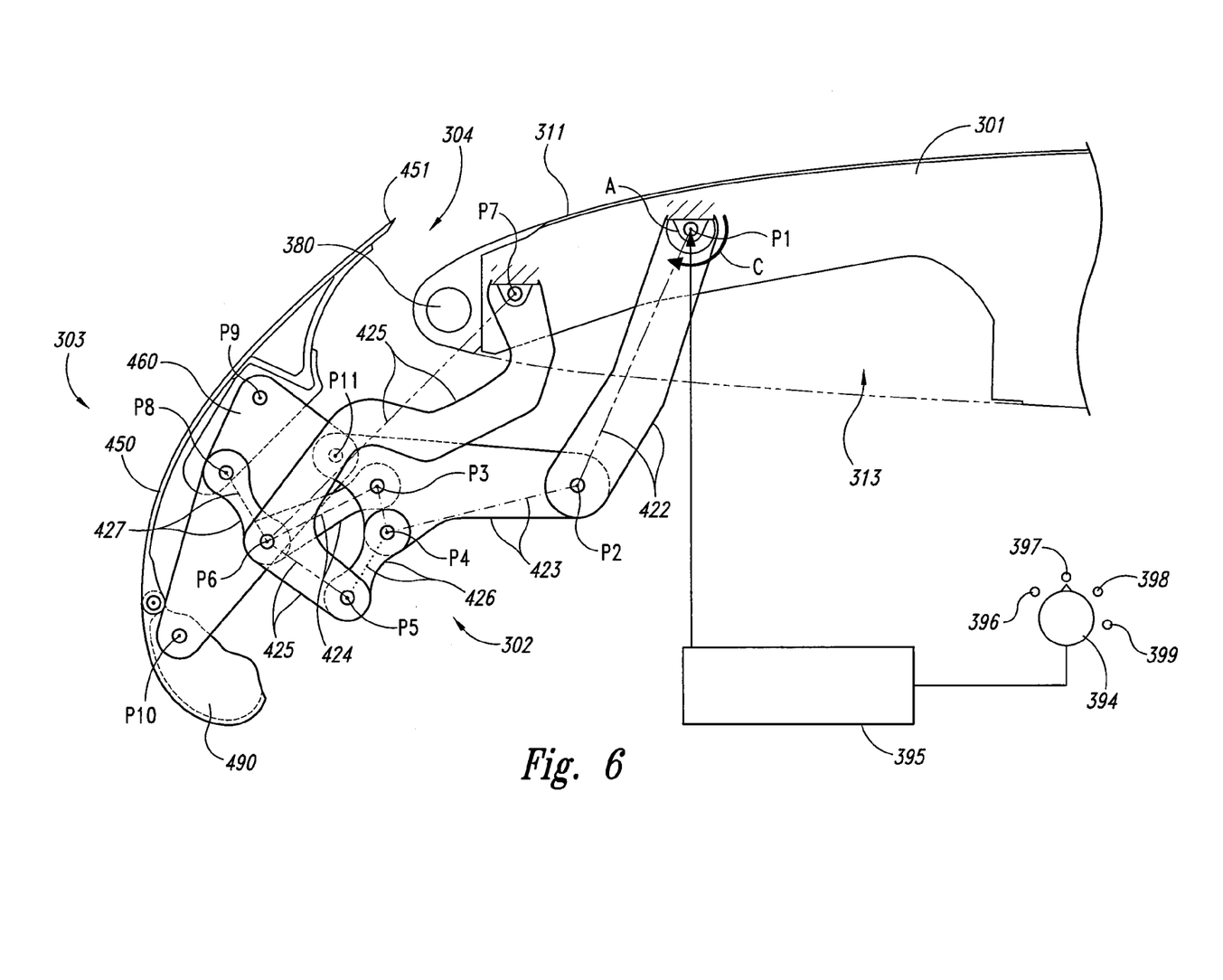
FIG. 6 is a partially schematic illustration of an aircraft system configured in accordance with an embodiment of the disclosure that includes a variable camber Krueger flap.

Unlike the arrangement described above with reference to FIGS. 1-5, the arrangement shown in FIG. 6 includes a panel support member 460 that does not form one of the links of the six-bar linkage. Instead, the panel support member 460 is pivotably coupled to the third link 423 at an eleventh pivot point P11, and is pivotably coupled to the leading edge panel 450 at a ninth pivot point P9 and to a bullnose 490 at a tenth pivot point P10. This arrangement allows the panel support member 460 to both flex the leading edge panel 450 and articulate the bullnose 490. A seventh link 427 is pivotably coupled between the fifth link 425 and the panel support member 460 to guide this motion.

The second link 422 is rotatable about the first pivot point P1 as indicated by arrow C in FIG. 6, and can be driven by an actuator A, generally as described above. To move the leading edge assembly 303 beyond the landing position shown in FIG. 6 to the take-off position shown in FIG. 7, the actuator A rotates the second link 422 clockwise, as shown by arrow C, to move the leading edge panel 450 and the bullnose 490 away from the opening 313.

Figure 7:
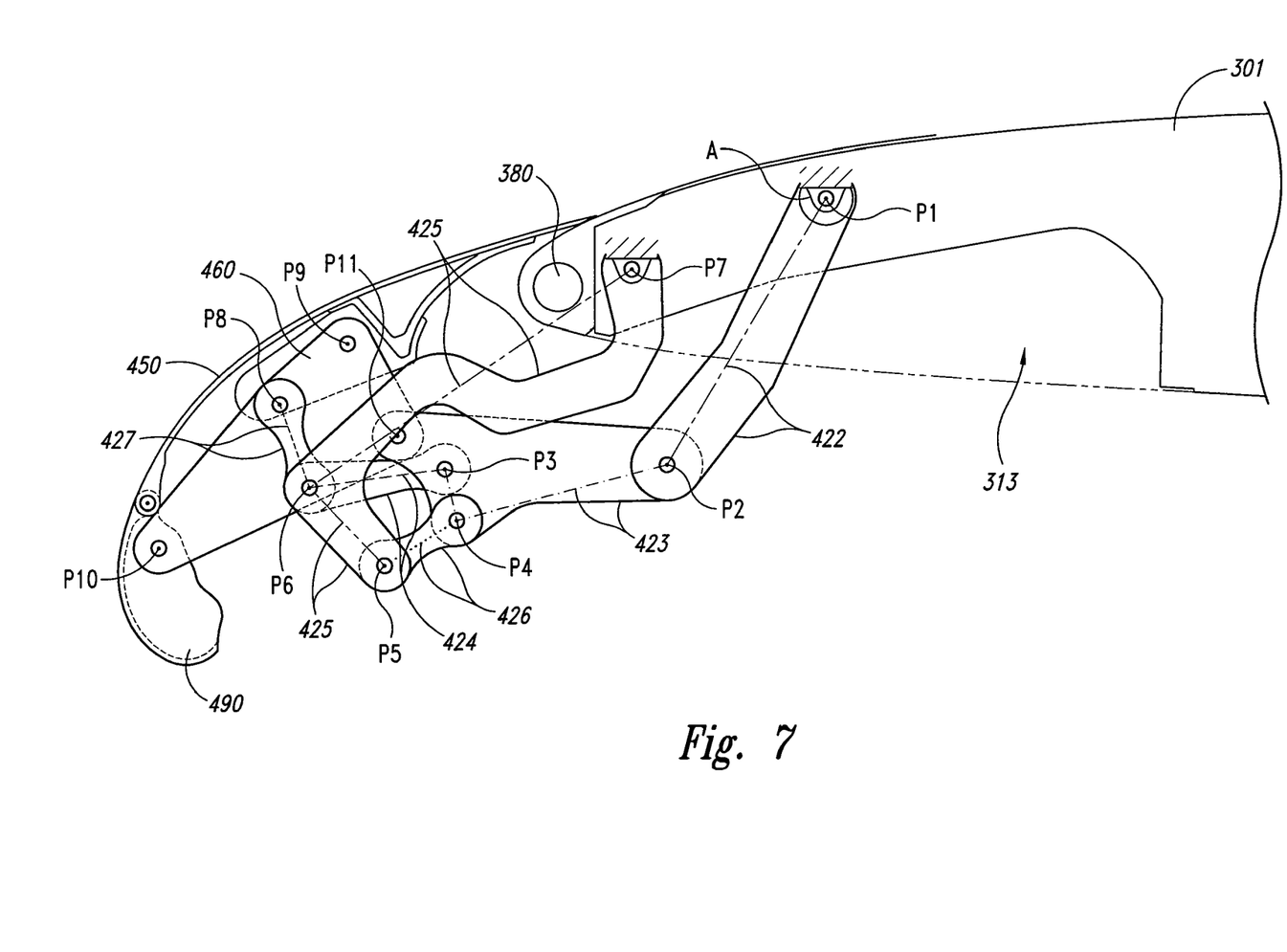
FIG. 7 illustrates the system of FIG. 6 in a take-off position.

FIG. 7 illustrates the system of FIG. 6 with the leading edge assembly 303 in a take-off position. In this position, the leading edge panel 450 is rotated further away from the opening 313. To achieve this position, the second link 422 is rotated about the first pivot point P1 by the actuator A, which moves the leading edge panel 450 into engagement or near engagement with the airfoil 301. The gap 304 shown in FIG. 6 between the leading edge panel 450 and the upper portion 311 can be sealed, partially sealed, or at least partially closed as a result of this motion.

Figure 8:
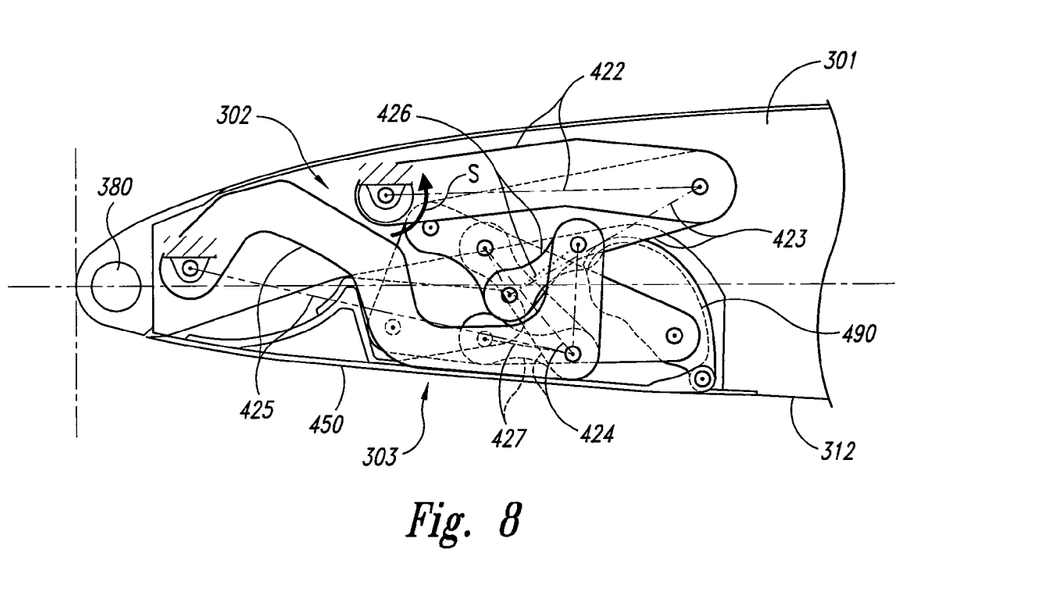
FIG. 8 illustrates the system of FIG. 6 in a stowed position.

FIG. 8 illustrates the system of FIG. 6 with the leading edge assembly 303 in a fully stowed position. When the leading edge assembly 303 is in its stowed position, it covers the opening 313 shown in FIG. 7 to provide for a generally aerodynamically smooth lower portion 312. To achieve this position, the second link 422 is rotated in a counterclockwise direction as shown by arrow S in FIG. 8. In this configuration the leading edge panel 450 has been folded toward the airfoil 301 so as to be flush with the leading edge and the lower surface 312, with the bullnose 490 and the link mechanism 302 housed completely within the airfoil 301.

Figure 9:
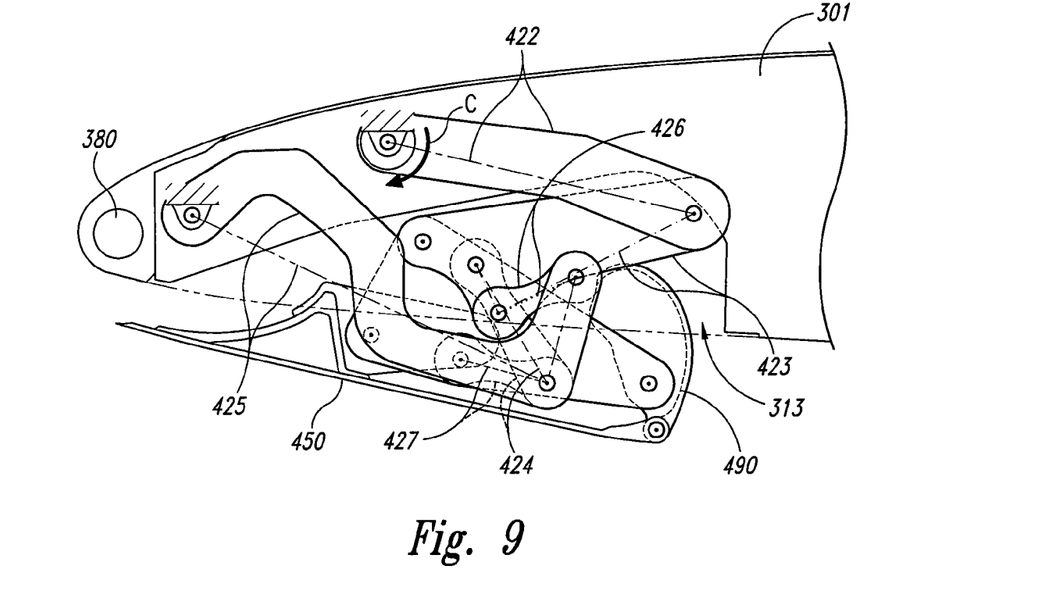
FIG. 9 illustrates the system of FIG. 6 in transition between a stowed position and a take-off and/or a landing position.
Figure 10:
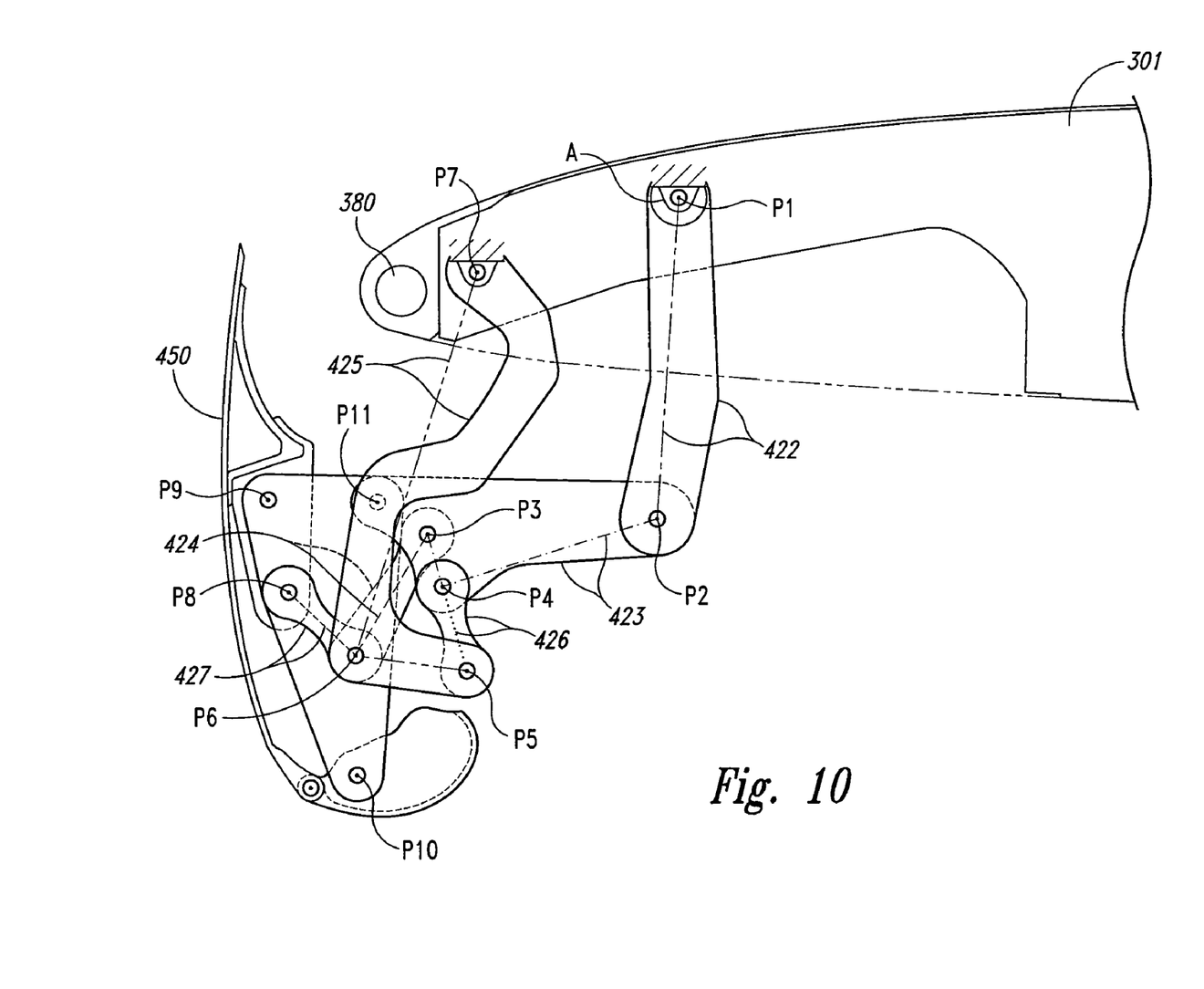
FIG. 10 illustrates the system of FIG. 6 in a generally vertical (e.g., "barn door") configuration.

FIG. 9 illustrates the system of FIG. 6 with the leading edge panel 450 moving from the stowed position shown in FIG. 8 to the take-off position and/or the landing position. To achieve either position, the second link 422 is rotated in a clockwise direction as indicated by arrow C. The leading edge panel 450 and the bullnose 490 move away from the opening 313. FIG. 10 illustrates another view of the system of FIG. 6 with the leading edge panel 450 moving to a generally vertical position or "barn door" configuration.

One feature of embodiments of the systems described above with reference to FIGS. 1 through 10 is that the link mechanism 302 can have six elements arranged in a six-bar, Stephenson II configuration. One expected advantage of this arrangement is that it can be simpler to manufacture, install, and/or maintain than an arrangement having a more complex set of links. At the same time, this arrangement is expected to be more compact (in the stowed position) than arrangements having fewer links. A corresponding advantage of this feature is that the link mechanism can more readily be installed on thin airfoil sections, e.g., airfoil sections at the outboard regions of a wing. Another corresponding advantage of at least some embodiments having these features is that they can allow a relatively thick bullnose (e.g., having a T/L ratio of 0.5 or greater) to be stowed in a thin airfoil section.

Another feature of at least some of the foregoing embodiments is that the link mechanism can readily accommodate other components located at the airfoil leading edge. For example, the arrangement described above with reference to FIGS. 1-5 accommodates the ice protection airflow duct 380 at a position between the two pivot points P1, P7 connecting the link mechanism 306 with the airfoil 301. Other link arrangements can interfere with such a positioning when the corresponding leading edge panel is stowed. In the arrangement shown in FIGS. 6-10, the ice protection airflow duct 380 is positioned forward at the forward pivot point P7, while still allowing the link mechanism 302 to assume a compact stowed configuration that integrates with the thin airfoil 301.

Still another feature of some embodiments of the system described above with reference to FIGS. 1 through 10 is that the system provides either a rigid Krueger flap or a variable camber Krueger flap moveable between at least three positions (e.g., the stowed position, the sealed take-off position, and the gapped landing position). Notably, in some embodiments, the gap 304 between the trailing edge 351 and the upper portion 311 may be sealed or at least partially sealed when the system is in the take-off position. Sealing or at least partially sealing the gap 304 during take-off is expected to preserve conditions for subsequently achieving and maintaining laminar flow during cruise, and/or otherwise reducing drag, for example, by restricting or preventing particles, debris, or other foreign objects from attaching to the surface of the wing at or upstream of a laminar flow region. In addition, because this mechanism is suitable for installation in thin wing sections, a greater spanwise extent of the leading edge is protected from debris, and accordingly this arrangement can achieve and/or promote laminar flow over a greater spanwise region of the airfoil.

Figure 11:
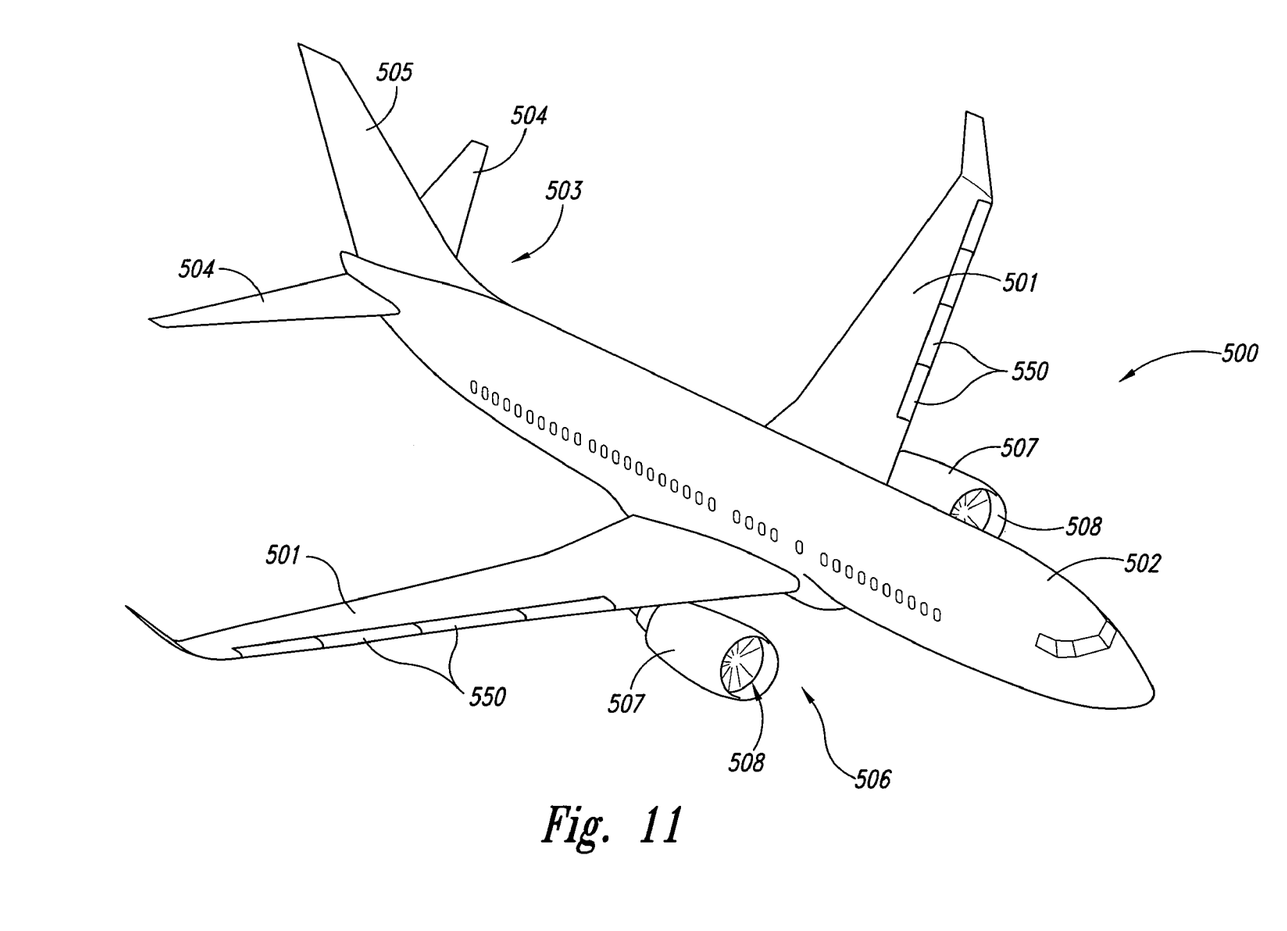
FIG. 11 illustrates an aircraft that can include any of the systems described above with reference to FIGS. 1-10.

FIG. 11 is a partially schematic, isometric illustration of an aircraft 500 that includes a fuselage 502, wings 501, and an empennage 503. The empennage 503 can include horizontal stabilizers 504 and a vertical stabilizer 505. The aircraft 500 further includes a propulsion system 506 having two wing-mounted nacelles 507, each carrying a turbofan engine 508. Each of the wings 501 can include one or more leading edge panels 550 configured in any of the foregoing embodiments. In a particular embodiment, the link mechanisms driving the leading edge panels 550 can be geometrically similar for inboard leading edge panels (e.g., located near the nacelles 507) and outboard leading edge panels, (e.g., located near the wing tip). Accordingly, a geometrically similar link mechanism can be scaled up for inboard locations and scaled down for outboard locations. This arrangement can simplify the design, installation and maintenance procedures associated with the leading edge panels.

From the foregoing it will be appreciated that specific embodiments of the disclosure have been described herein for purposes of illustration but that various modifications may be made without deviating from the disclosure. For example, the elements of the link mechanisms may have different shapes than are shown in the Figures. In other embodiments, the actuator may be coupled to different links than are shown in the Figures. In particular embodiments, the flaps may have configurations other than a Krueger configuration. Aspects of the disclosure described in the context of particular embodiments may be combined or eliminated in other embodiments. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the disclosure can include other embodiments not expressly shown or described above.

We claim:

1. An aircraft system, comprising:

an airfoil having an external flow surface, the external flow surface comprising an upper portion and a lower portion, the airfoil forming a base link;

a six-bar linkage coupled to the airfoil and having a configuration that includes:

a binary second link pivotably connected to the airfoil at a first location;

a ternary third link pivotably connected to the second link;

a binary fourth link pivotably connected to the third link;

a ternary fifth link pivotably connected to the fourth link and pivotably connected to the airfoil at a second location, the first and second locations being fixed relative to each other; and a binary sixth link pivotably connected to the third link and the fifth link; and a deployable leading edge panel carried by the linkage, the leading edge panel being movable via the linkage between a stowed position and at least one deployed position.

2. The system of claim 1 wherein the fifth link is pivotably connected to the airfoil at the second location forward of the first location, and wherein the system further comprises an ice protection airflow duct positioned between the first and second locations.

3. The system of claim 1 wherein the fifth link is pivotably connected to the airfoil at the second location forward of the first location, and wherein the system further comprises an ice protection airflow duct positioned forward of the second location.

4. The system of claim 1 wherein the leading edge panel forms a part of the lower portion when in the stowed position.

5. The system of claim 1 wherein the at least one deployed position includes a landing position and a take-off position, and wherein the leading edge panel (a) forms a part of the lower portion when in the stowed position, (b) has a trailing edge that is spaced apart from the upper portion to form a gap when in the landing position, and (c) seals the gap when in the take-off position.

6. The aircraft system of claim 1, further comprising:
an actuator coupled to the linkage;
a controller coupled to the actuator; and
a selector coupled to the controller and changeable among multiple selectable positions to which the leading edge panel can be deployed, wherein the controller controls the actuator to move the leading edge panel to a selected position based on input from the selector.

7. The system of claim 1 wherein the leading edge panel is fixedly carried by the fourth link.

8. The system of claim 1 wherein the leading edge panel is pivotable relative to the fourth link.

9. The system of claim 8 wherein the leading edge panel is carried by a panel support member, and wherein the panel support member is pivotably connected to the third link.

10. The system of claim 9, further comprising a bullnose pivotably coupled to the leading edge panel, and wherein:
the leading edge panel is flexible and changes shape as the leading edge panel moves from the stowed position to the at least one deployed position; and
the panel support member is pivotably coupled to the bullnose.

11. The system of claim 9, further comprising:
a bullnose pivotably coupled to the leading edge panel
a support panel pivotably coupled to the leading edge panel, the bullnose, and the third link; and
a seventh link pivotably connected between the support panel and the fifth link; wherein:
the at least one deployed position includes a landing position and a take-off position;
the leading edge panel (a) forms a part of the lower portion when in the stowed position, (b) has a trailing edge that is spaced apart from the upper portion to form a gap when in the landing position, and (c) at least partially seals the gap when in the take-off position; and
the leading edge panel is flexible and changes shape as the leading edge panel moves from the stowed position to at least one of the landing position and the take-off position.

12. An aircraft system comprising:
a fuselage;
a wing attached to the fuselage, the wing having an external flow surface, the external flow surface comprising an upper portion and a lower portion, the airfoil forming a base link;
a six-bar linkage coupled to the airfoil and having a configuration that includes:
a binary second link pivotably connected to the airfoil at a first location;
a ternary third link pivotably connected to the second link;
a binary fourth link pivotably connected to the third link;
a ternary fifth link pivotably connected to the fourth link and pivotably connected to the airfoil at a second location, the first and second locations being fixed relative to each other; and
a binary sixth link pivotably connected to the third link and the fifth link; and
a deployable leading edge panel carried by the linkage, the leading edge panel being movable via the linkage among a stowed position, a landing position, and a take-off position, and wherein the leading edge panel (a) forms a part of the lower portion when in the stowed position, (b) has a trailing edge that is spaced apart from the upper portion to form a gap when in the landing position, and (c) at least partially seals the gap when in the take-off position, further wherein the leading edge panel maintains a generally fixed shape as it is moved among the stowed position, the landing position and the take-off position, and wherein fourth link includes a generally rigid support panel that carries the leading edge panel.

13. The system of claim 12, further comprising a bullnose pivotably connected to the leading edge panel and to a seventh link that is in turn pivotably connected to the third link.

14. The system of claim 12 wherein the fifth link is pivotably connected to the airfoil at the second location forward of the first location, and wherein the system further comprises an ice protection airflow duct positioned between the first and second locations.

15. The system of claim 12 wherein the leading edge panel is one of multiple leading edge panels positioned in a spanwise direction along the wing, with the thickness of the wing being different at different spanwise locations, and wherein individual leading edge panels are connected to the wing with corresponding individual six-bar linkages having Stephenson II configurations.

16. The aircraft system of claim 12, further comprising:
an actuator coupled to the linkage;
a controller coupled to the actuator; and
a selector coupled to the controller and changeable among multiple selectable positions to which the leading edge panel can be deployed, wherein the controller controls the actuator to move the leading edge panel to a selected position based on input from the selector.

17. An aircraft system comprising:
a fuselage;
a wing attached to the fuselage, the wing having an external flow surface, the external flow surface comprising an upper portion and a lower portion, the airfoil forming a base link;
a six-bar linkage having a configuration that includes:
a binary second link pivotably connected to the airfoil at a first location;
a ternary third link pivotably connected to the second link;
a binary fourth link pivotably connected to the third link;

a ternary fifth link pivotably connected to the fourth link and pivotably connected to the airfoil at a second location, the first and second locations being fixed relative to each other; and a binary sixth link pivotably connected to the third link and the fifth link; and a deployable leading edge panel carried by the linkage, the leading edge panel being movable via the linkage among a stowed position, a landing position, and a take-off position;

a bullnose pivotably coupled to the leading edge panel;

a support panel pivotably coupled to the leading edge panel, the bullnose, and the third link; and a seventh link pivotably connected between the support panel and the fifth link; wherein:

the leading edge panel (a) forms a part of the lower portion when in the stowed position, (b) has a trailing edge that is spaced apart from the upper portion to form a gap when in the landing position, and (c) at least partially seals the gap when in the take-off position; and the leading edge panel is flexible and changes shape as the leading edge panel moves from the stowed position to at least one of the landing position and the take-off position.

18. The system of claim 17 wherein the fifth link is pivotably connected to the airfoil at the second location forward of the first location, and wherein the system further comprises an ice protection airflow duct positioned forward of the second location.

19. The system of claim 17 wherein the leading edge panel forms a part of the lower portion when in the stowed position.

20. The aircraft system of claim 17, further comprising:
an actuator coupled to the linkage;
a controller coupled to the actuator; and
a selector coupled to the controller and changeable among multiple selectable positions to which the leading edge panel can be deployed, wherein the controller controls the actuator to move the leading edge panel to a selected position based on input from the selector.

21. A method for operating an aircraft wing system, comprising:
deploying a leading edge panel relative to an airfoil having an external flow surface, the airfoil forming a base link, the leading edge panel having a configuration that includes:
a binary second link pivotably connected to the airfoil at a first location;
a ternary third link pivotably connected to the second link;
a binary fourth link pivotably connected to the third link;
a ternary fifth link pivotably connected to the fourth link and pivotably connected to the airfoil at a second location, the first and second locations being fixed relative to each other; and
a binary sixth link pivotably connected to the third link and the fifth link, wherein the leading edge panel is carried by the linkage;
stowing the leading edge panel after take-off; and
deploying the leading edge panel to be spaced apart from a leading edge of the wing during at least one of approach and landing.

22. The method of claim 21 wherein stowing the leading edge panel includes stowing the leading edge panel in an opening at a lower surface of the airfoil.

23. The method of claim 21 wherein the leading edge panel has a generally fixed, rigid shape, and wherein deploying and stowing the leading edge panel are completed while the leading edge panel has a generally fixed, rigid shape.

24. The method of claim 21 wherein the leading edge panel has a flexible shape wherein at least one of stowing the leading edge panel and deploying the leading edge panel includes changing a shape of the leading edge panel.

25. The method of claim 21, further comprising shielding the airfoil with the leading edge panel during take-off to at least restrict debris from attaching to the external flow surface.

26. An aircraft system, comprising:
an airfoil having an external flow surface, the external flow surface comprising an upper portion and a lower portion, the airfoil forming a base link;
a six-bar linkage coupled to the airfoil and having a configuration that includes:
a second link pivotably connected to the airfoil at a first pivot point having a first location;
a third link pivotably connected to the second link at a second pivot point offset from the first pivot point;
a fourth link pivotably connected to the third link at a third pivot point;
a fifth link pivotably connected to the airfoil at a seventh pivot point having a second location fixed relative to the first location, the fifth link being pivotably connected to the fourth link at a sixth pivot point; and
a sixth link pivotably connected to the third link at a fourth pivot point, and pivotably connected to the fifth link at a fifth pivot point, the second, third and fourth pivot points being offset from each other, the fifth, sixth and seventh pivot points being offset from each other; and
a deployable leading edge panel carried by the linkage, the leading edge panel being movable via the linkage between a stowed position and at least one deployed position.

* * * * *